(12) United States Patent
Thiel

(10) Patent No.: US 11,733,826 B2
(45) Date of Patent: Aug. 22, 2023

(54) VIRTUAL ENVIRONMENT INTERACTIVITY FOR VIDEO COMMUNICATIONS PARTICIPANTS

(71) Applicant: Zoom Video Communications, Inc., San Jose, CA (US)

(72) Inventor: Jordan Thiel, Leander, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/515,496

(22) Filed: Oct. 31, 2021

(65) Prior Publication Data

US 2023/0139126 A1  May 4, 2023

(51) Int. Cl.
G06T 19/00 (2011.01)
G06F 3/04815 (2022.01)
H04L 65/403 (2022.01)
G06T 13/40 (2011.01)

(52) U.S. Cl.
CPC .......... *G06F 3/04815* (2013.01); *G06T 13/40* (2013.01); *G06T 19/006* (2013.01); *H04L 65/403* (2013.01); *G06T 2200/24* (2013.01); *G06T 2219/024* (2013.01)

(58) Field of Classification Search
None
See application file for complete search history.

(56) References Cited

U.S. PATENT DOCUMENTS 10,403,050 B1 *  9/2019  Beall ................. G06F 3/017
2019/0253667 A1 *  8/2019  Valli ................. H04S 7/303

OTHER PUBLICATIONS

Square, "What's the Difference Between and SDK and an API?" https://squareup.com/us/en/townsquare/sdk-vs-api, 2020. (Year: 2020).*

* cited by examiner

*Primary Examiner* — Nicholas R Wilson
(74) *Attorney, Agent, or Firm* — Young Basile Hanlon & MacFarlane, P.C.

(57) ABSTRACT

Methods, systems, and apparatus, including computer programs encoded on computer storage media relate to a method for virtual environment interactivity for video communications participants. The system may provide a video conference session in a virtual environment. The system may provide a digital representation of a video conference participant in the virtual environment. The system may display an interactive view. The system may move the digital representation in the virtual environment based on input received in the interactive view.

20 Claims, 13 Drawing Sheets

VIRTUAL ENVIRONMENT INTERACTIVITY FOR VIDEO COMMUNICATIONS PARTICIPANTS

FIELD

The present invention relates generally to video communications, and more particularly, to systems and methods for providing virtual environment interactivity for users of a video communications platform.

SUMMARY

The appended claims may serve as a summary of this application.

DETAILED DESCRIPTION OF THE DRAWINGS

Figure 1A:
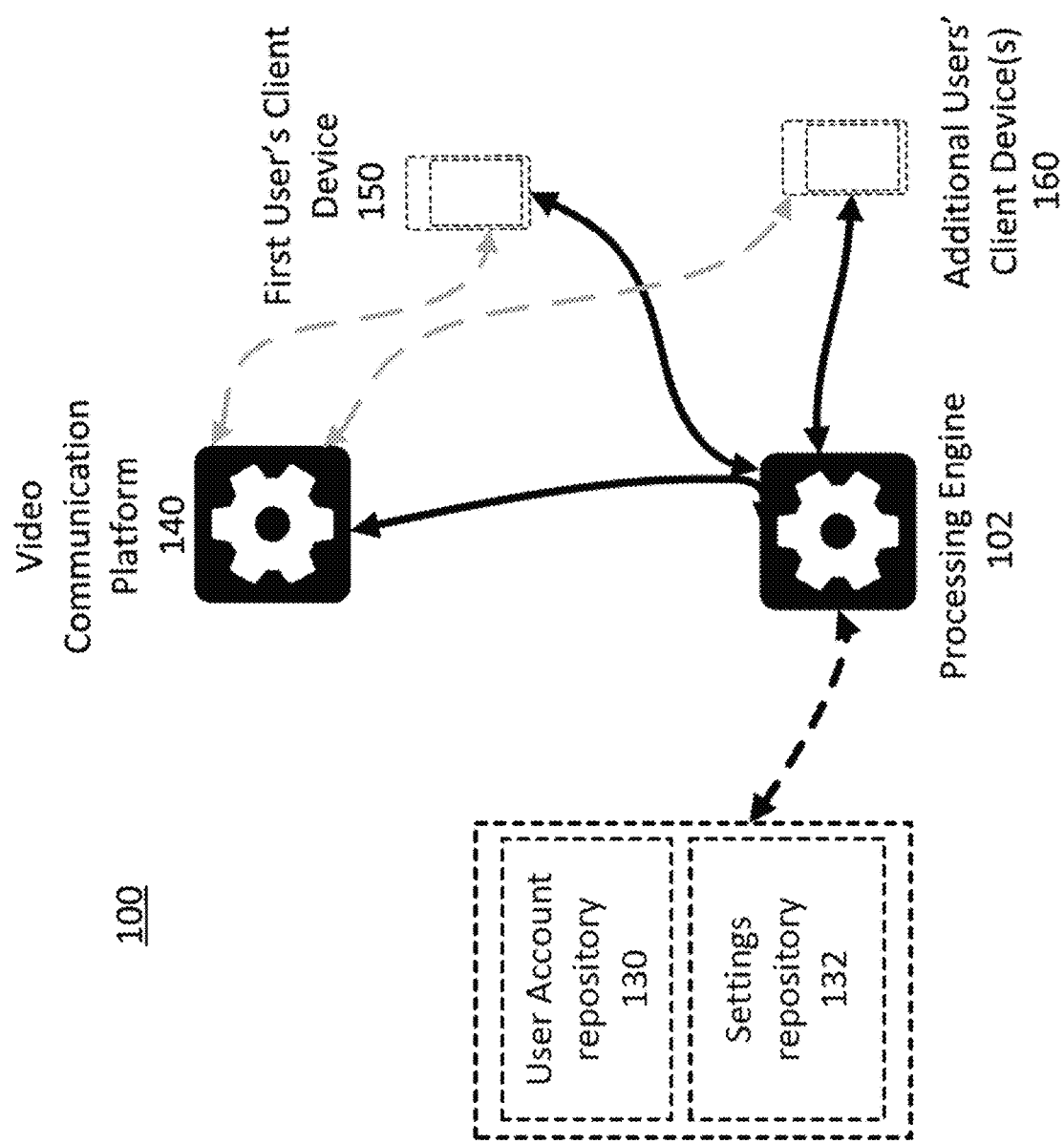
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 900, 1000, 1100, or other methods herein and, as a result, provide for virtual environment interactivity for video communications participants. A virtual environment may comprise a VR environment or AR environment. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the methods 900, 1000, 1100, or other methods herein and, as a result, provide for virtual environment interactivity for video communications participants. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 may be devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, webinar, or any other suitable video presentation) on a video communication platform. The additional users' client device(s) 160 may be configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, video phone, conferencing system, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include virtual environment settings, virtual reality (VR) settings, augmented reality (AR) settings, audio settings, video settings, video processing settings, and so on. Settings may include enabling and disabling one or more features, selecting quality settings, selecting one or more options, and so on. Settings may be global or applied to a particular user account.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
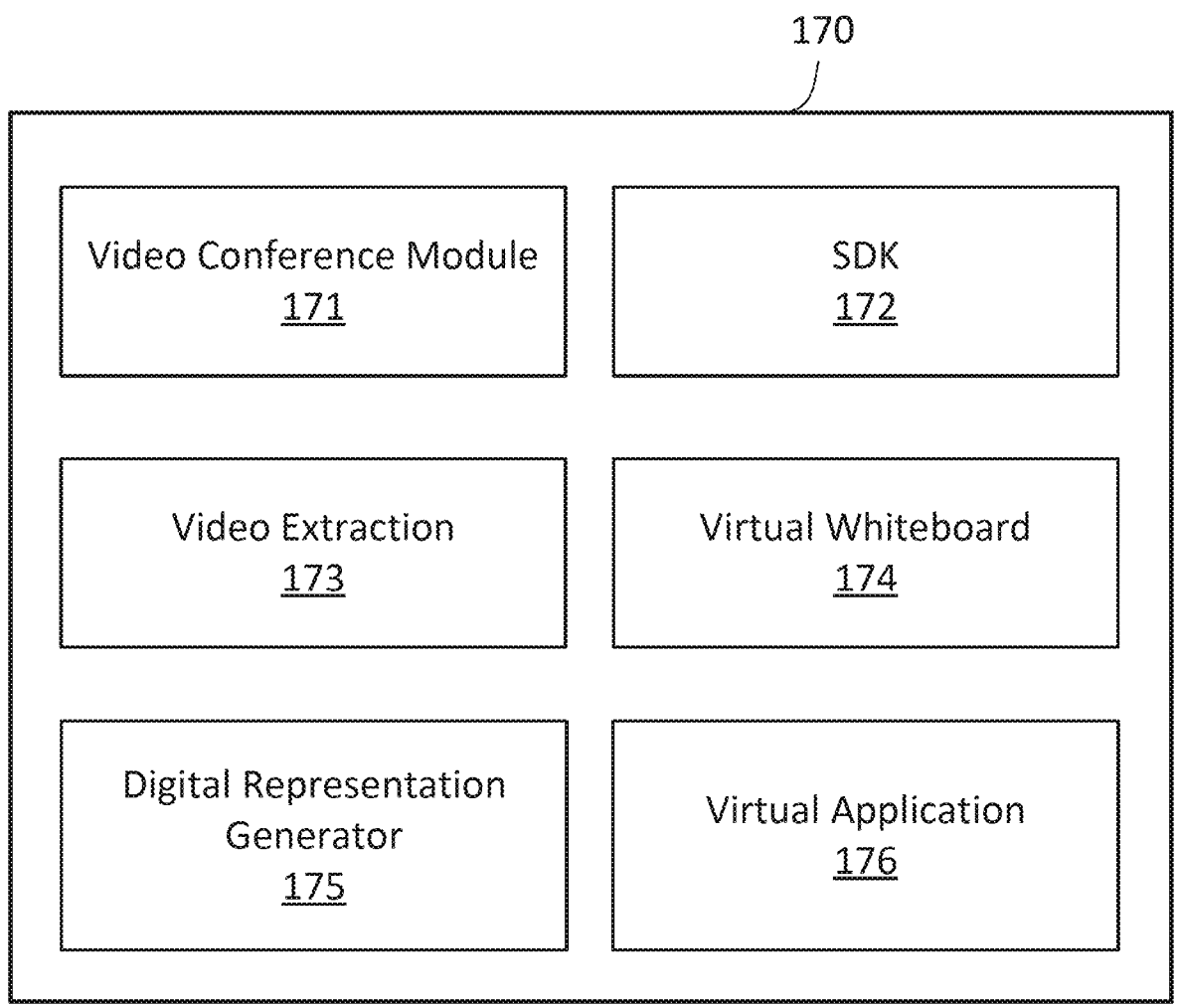
FIG. 1B is a diagram illustrating an exemplary computer system with software and/or hardware modules that may execute some of the functionality described herein.

FIG. 1B is a diagram illustrating an exemplary computer system 170 with software and/or hardware modules that may execute some of the functionality described herein. Computer system 170 may comprise, for example, a server or client device or a combination of server and client devices for extracting a user representation from a video stream to a virtual environment.

Video conference module 171 provides system functionality for providing video conferences between one or more video conference participants. Video conference module 171 may comprise part or all of the video communication platform 140 and/or processing engine 102. Video conference module 171 may host a video conference session that enables one or more participants to communicate over video. In some embodiments, video conference module 171 may require users to authenticate themselves to join a video conference, such as by providing credentials like a username and/or password. In some embodiments, video conference module 171 may allow guest users to join a video conference without authenticating themselves and may notify participants in the meeting that one or more unauthenticated participants are present. A video conference session may include one or more video streams that each display one or more of the participants, or other scenes such as a screen-share or a virtual environment as described herein. In an embodiment, synchronized audio may be provided with the video streams.

Software development kit (SDK) 172 provides system functionality for enabling an application to interface with the video conference module 171. In some embodiments, SDK 172 may comprise an application programming interface (API). SDK 172 may be distributed to enable software developers to use functionality of the video conference module 171 in first party or $3^{rd}$ party software applications. In some embodiments, SDK 172 may enable first party or $3^{rd}$ party software applications to provide video communication such as video conferencing via the video communication platform 140 and processing engine 102. In some embodiments, SDK 172 may enable VR or AR applications to integrate video communication into a virtual environment.

Video extraction module 173 provides system functionality for extracting a portion of video containing a user from video content containing the user and a background. In an embodiment, video extraction module 173 may remove a background from video content. In an embodiment, the video extraction module 173 may determine a boundary between a user in a video and the background. The video extraction module 173 may retain the portion of the video depicting the user and remove the portion of the video depicting the background. In an embodiment, the video extraction module 173 may optionally replace the background with a transparent or translucent background or may leave the background empty.

Virtual whiteboard 174 provides system functionality for a virtual collaboration space. In some embodiments, virtual whiteboard 174 may allow functionality such as creating and editing objects, drawing, erasing, creating and deleting text or annotations, and so on. In an embodiment, one or more participants in a video conference session may share one or more virtual whiteboards 174 where they may collaborate and share information. In some embodiments, the contents of one or more virtual whiteboards 174 may be stored for retrieval at a later date. In some embodiments, contents of one or more virtual whiteboards 174 may be combined with other virtual whiteboards 174, such as by importing the content of virtual whiteboard into another virtual whiteboard.

Digital representation generator 175 provides system functionality for generating a digital representation of a user. In an embodiment, the digital representation generator 175 may generate a digital representation of a video conference participant. In an embodiment, the digital representation of the video conference participant may be provided in a virtual environment. In an embodiment, the generated digital representation may use an extracted video of a video conference participant from video extraction module 173. In alternative variations, the generated digital representation may be generated based on a still image of the video conference participant. Alternatively, the generated digital representation may be based on configuration settings, such as avatar creation by a video conference participant. In an embodiment, the generated digital representation may comprise a 2D or 3D representation.

Digital representation generator 175 may be configured to generate one or several different types of digital representations. In one embodiment, the digital representation of the video conference participant may comprise extracted video of the video conference participant from video extraction module 173. In one embodiment, the digital representation of the video conference participant may comprise a flat shape displaying on a surface of the flat shape the extracted video of the video conference participant from video extraction module 173. In one embodiment, digital representation of the video conference participant may comprise a 3D mesh generated based on the extracted video of the video conference participant and displaying on the surface of the 3D mesh the extracted video of the video conference participant. In one embodiment, the digital representation of the video conference participant may comprise a 3D avatar. In one embodiment, the 3D avatar may be generated based on configuration settings of the video conference participant. Alternatively, the 3D avatar may be generated based on the extracted video of the video conference participant.

Virtual application 176 provides system functionality for displaying and/or interacting with a virtual environment. In an embodiment, virtual application 176 may enable a user of a video conference application to access a virtual environment from a computer system, such as a desktop, laptop, smartphone, tablet, and other computer systems. In one embodiment, virtual application 176 may comprise the virtual environment. In one embodiment, virtual application 176 comprises a 3D engine for displaying the virtual environment. In one embodiment, the virtual application 176 may receive user input for moving a digital representation of a video conference participant in the virtual environment. In one embodiment, the virtual application 176 may allow selecting a location for the digital representation of the video conference participant or may allow free movement. In one embodiment, the virtual application 176 may be embedded in a video conference application. In one embodiment, the virtual application 176 may run in a web browser and may optionally comprise a web application.

Figure 2:
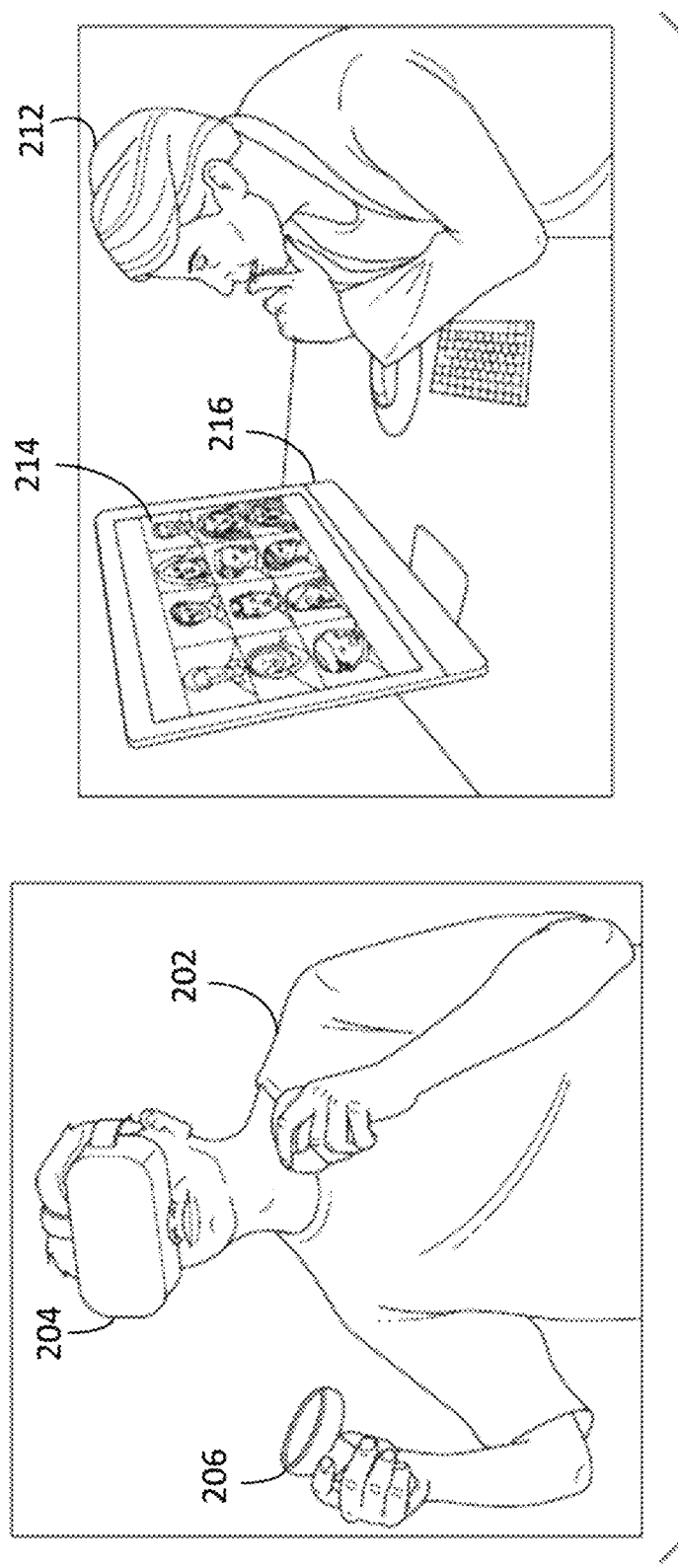
FIG. 2 illustrates one or more client devices that may be used to participate in a video conference and/or virtual environment.

FIG. 2 illustrates one or more client devices that may be used to participate in a video conference and/or virtual environment.

In an embodiment, a VR headset 204 may be worn by a VR user 202 to interact with a VR environment. The VR headset 204 may display 3D graphics to the VR user 202 to represent a VR environment, which may be generated by a VR application. Moreover, the VR headset 204 may track the movement of the VR user's head and/or other body parts to update its display to simulate an experience of being in the VR environment. In an embodiment, a VR headset 204 may optionally include controllers 206 to control the VR application. In some embodiments, the VR headset 204 may enable the VR user 202 to participate in a video conference within a VR environment.

Similarly, in an embodiment, an AR headset may be worn by an AR user to interact with an AR environment. The AR headset may display AR graphics, such as holograms, to the AR user to represent an AR environment, which may be generated by an AR application. The AR application may enable viewing a mixed reality environment that includes some AR objects and some real objects. Moreover, the AR headset may track the movement of the AR user's head or other body parts to update its display to simulate the AR environment. In an embodiment, an AR headset may optionally include controllers to control the AR application. In some embodiments, the AR headset may enable the AR user to participate in a video conference within an AR environment.

In an embodiment, a computer system 216 may provide a video conference application 214 that is communicably connected to video communication platform 140 and processing engine 102. The video conference application 214 may enable a video conference participant 212 to communicate with other participants on a video conference, including participants joining from video conference application 214 or VR headset 204 or an AR headset.

Figure 3:
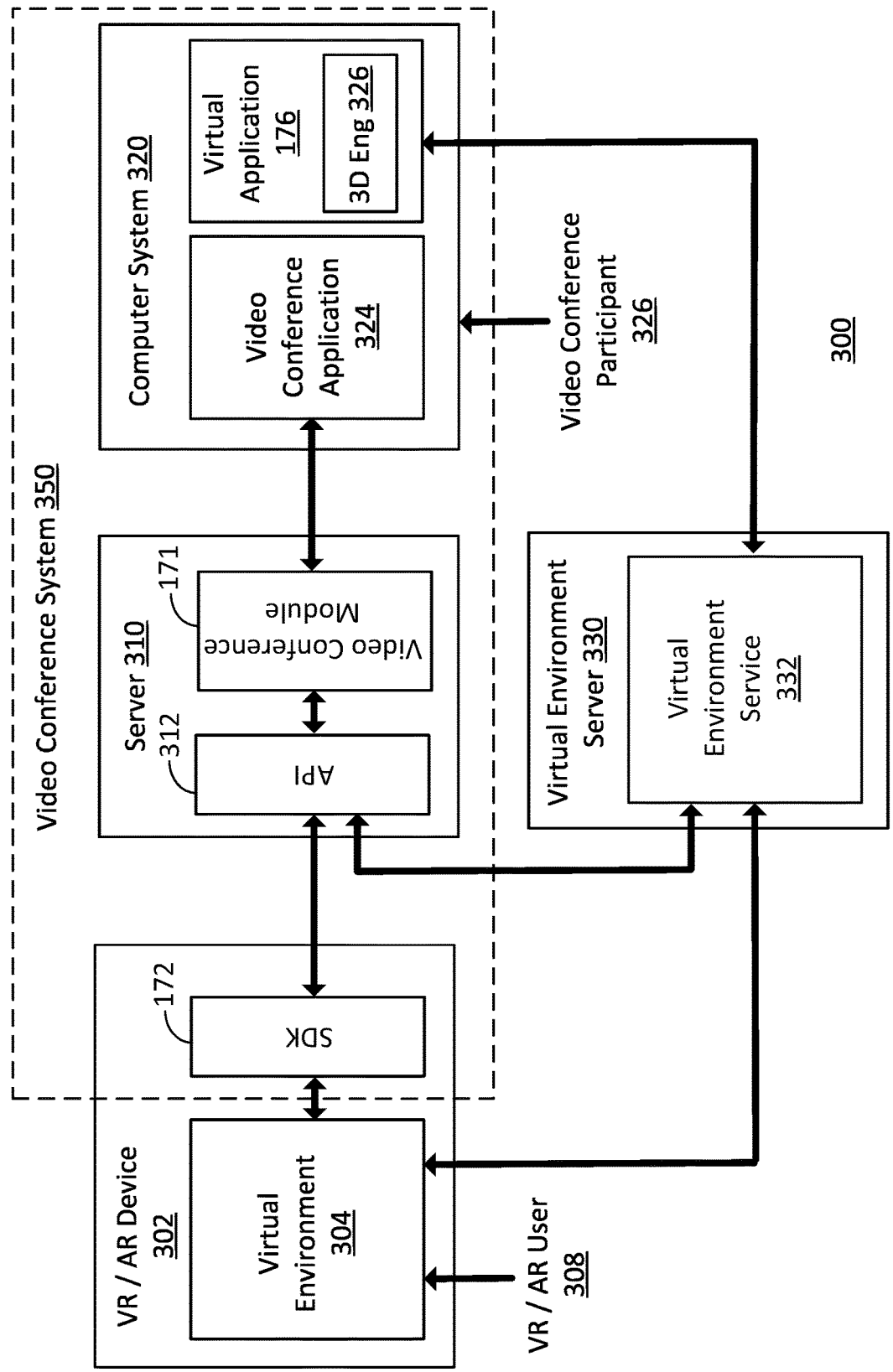
FIG. 3 is a diagram illustrating an exemplary environment in which some embodiments may operate.

FIG. 3 is a diagram illustrating an exemplary environment 300 in which some embodiments may operate. In an embodiment, computer system 320 provides a video conference application 324 that enables video conference participant 326 to join a video conference session. The video conference application 324 connects to server 310 hosting video conference module 171. The video conference module 171 may provide system functionality for hosting one or more video conference sessions and connecting one or more participants via video communication.

In an embodiment, computer system 320 optionally includes virtual application 176. In an embodiment, the virtual application 176 may comprise a copy of the virtual environment 304. In an embodiment, the virtual application 176 may connect to virtual environment server 330 and may enable displaying and interacting with the local copy of the virtual environment 304. In an embodiment, both the video conference application 324 and virtual application 176 may be displayed to the video conference participant 326, in some cases simultaneously. In an embodiment, the virtual application 176 may comprise a component of the video conference application 324 or may comprise a separate application. In an embodiment, the virtual application 176 may comprise a 3D engine 326, which may render the local copy of the virtual environment 304. In an embodiment, the local copy of the virtual environment 304 may connect to the virtual environment service 332 on the virtual environment server 330. In some embodiments, the virtual application 176 may communicate with the virtual environment service 332 using an API of the virtual environment service 332.

In an embodiment, a VR/AR device 302, which may comprise a VR or AR device such as a headset, displays a virtual environment 304, which may comprise a VR environment or AR environment. VR/AR user 308, which may comprise a VR or AR user, may interact with the virtual environment 304 using the VR/AR device 302. Virtual environment 304 may connect with SDK 172 on VR/AR device 302. SDK 172 enables the virtual environment 304, which may comprise a VR or AR application, to connect to API 312 on server 310. The API 312 may provide access to functionality of video conferencing module 171. Virtual environment 304 may be enabled to provide access to video conference sessions that may include other VR/AR users and video conference participant 326 through SDK 172, API 312, and video conference module 171.

In an embodiment, virtual environment 304 may connect to virtual environment service 332 on virtual environment server 330. In an embodiment, the virtual environment service 332 may host a backend of the virtual environment 304. The virtual environment service 332 may comprise data and functions for providing the virtual environment 304 to the VR/AR user 308. For example, virtual environment service 332 may store persistent objects and locations in the virtual environment 304 and maintain a consistent virtual world for experience by other VR/AR users who may also join the same virtual environment through their own VR/AR device. In an embodiment, the virtual environment service may optionally provide the same backend data and services to the local copy of the virtual environment 304 in the virtual application 176. In an embodiment, the virtual environment service 332 may optionally connect to the API 312 to communicate data to and from the video conference module 171. For example, the virtual environment service 332 may transmit or receive global data about the virtual environment 304 with the video conference module 171. In an embodiment, the virtual environment server 330 may include a copy of SDK 172 for interfacing between virtual environment service 332 and API 312.

In an embodiment, the computer system 320, video conference application 324, virtual application 176, server 310, video conference module 171, API 312, and SDK 172 may comprise aspects of a video conference system 350. In an embodiment, the virtual environment 304, virtual environment server 330, and virtual environment service 332 may comprise aspects of a $3^{rd}$ party VR or AR application. Alternatively, the virtual environment 304, virtual environment server 330, and virtual environment service 332 may comprise aspects of a first party VR/AR application that comprise further aspects of video conference system 350.

II. Exemplary Systems

Figure 4:
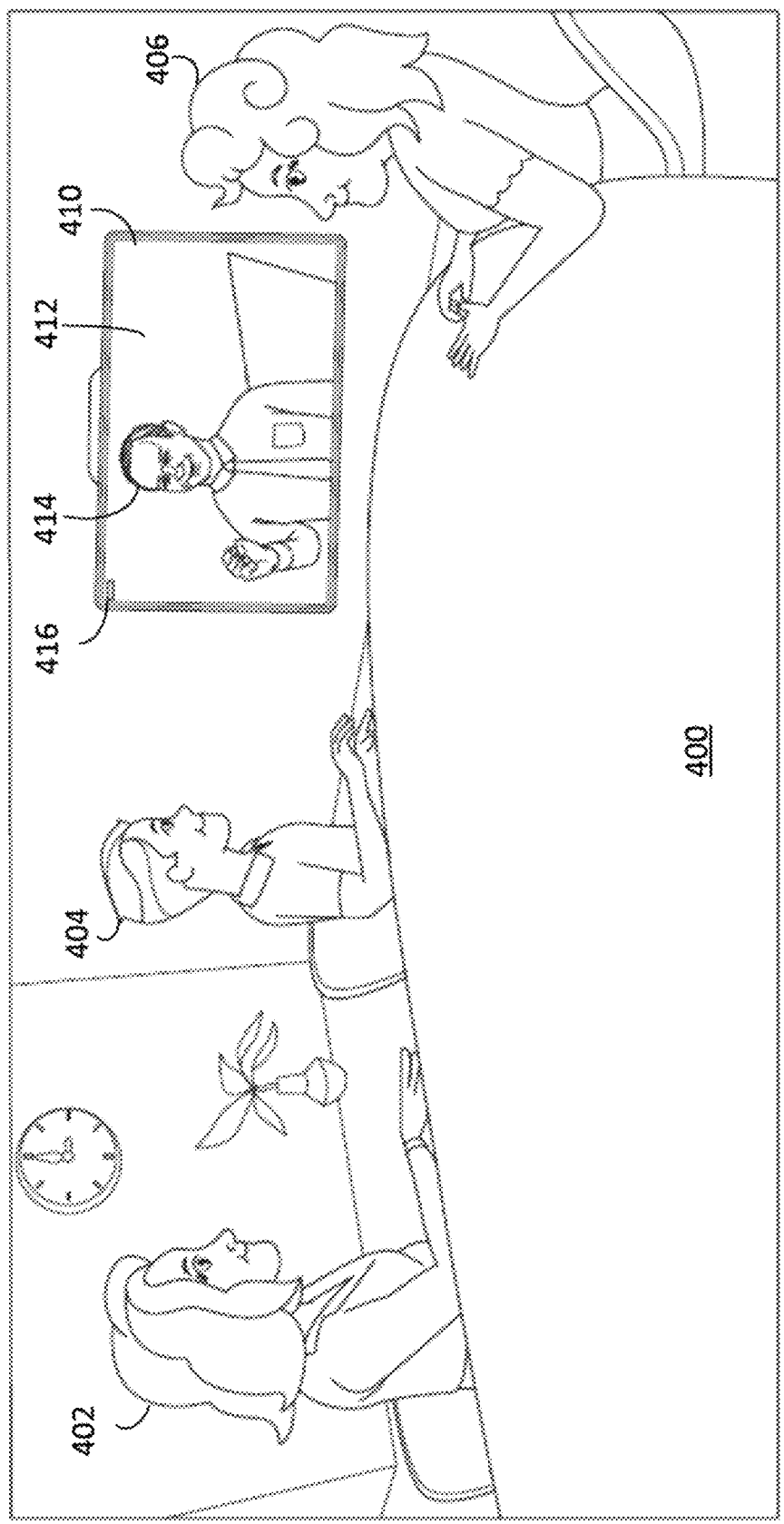
FIG. 4 illustrates an exemplary virtual environment according to one embodiment of the present disclosure.

FIG. 4 illustrates an exemplary virtual environment 400 according to one embodiment of the present disclosure. The virtual environment 400 may comprise a VR or AR environment such as a 3D world including digital representations, such as 3D avatars 402, 404, 406, of one or more users. Digital representations may also comprise 2D representations, such as images, videos, sprites, and so on. Each of the digital representations may represent a VR/AR user who is viewing and interacting with the virtual environment 400 from a VR/AR device. The virtual environment 400 may be displayed to each VR/AR user from the perspective of their digital representations. The virtual environment 400 is illustrated as an indoor conference room, but any other virtual environment may also be presented such as representations of outdoor areas, video game worlds, and so on.

Video conference view 410 in virtual environment 400 may display a video stream 412 including real-time video of video conference participant 414. The video may be captured from the camera of the computer system of the video conference participant 414. The VR or AR application may receive video stream 412 from video conference module 171 through SDK 172 and render the video stream 412 on the surface of a 3D object in the virtual environment 400, such as a 3D representation of a screen, projector, wall, or other object. In an embodiment, the video conferencing application may run in the virtual environment 400. VR or AR application may render a user interface 416 of the video conferencing application that may contain the video stream 412. The user interface 416 may also be rendered on the surface of a 3D object.

Figure 5:
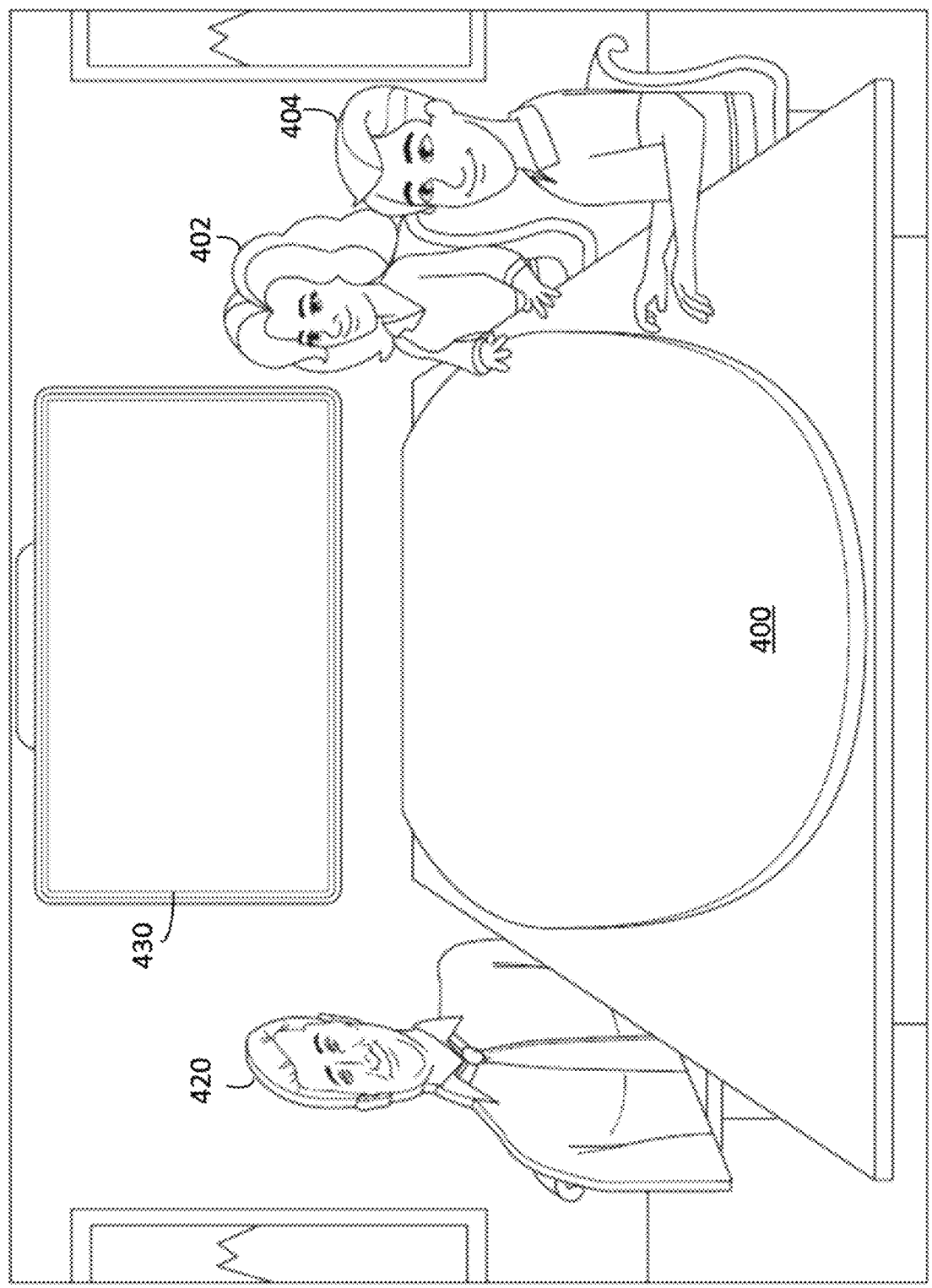
FIG. 5 illustrates an exemplary virtual environment according to one embodiment of the present disclosure.

FIG. 5 illustrates an exemplary virtual environment 400 according to one embodiment of the present disclosure. As described elsewhere herein, the virtual environment 400 may comprise a VR or AR environment such as a 3D world including digital representations, such as 3D avatars 402, 404, of one or more users. The virtual environment 400 may include a digital representation 420 of a video conference participant. Digital representation 420 may alternatively be referred to as an avatar, virtual character, or the like. The digital representation 420 of the video conference participant may be 2D or 3D. In an embodiment, the digital representation 420 of the video conference participant may comprise a video of the video conference participant. In an embodiment, the video may comprise a streaming video that plays in real-time. In an embodiment, the video of the video conference participant may be extracted by the video extraction module 173. In an embodiment, the video of the video conference participant may comprise video depicting imagery of the video conference participant with the background removed. One digital representation 420 is illustrated, but more or fewer digital representations of other video conference participants may be provided in the virtual environment 400.

In an embodiment, the digital representation 420 of the video conference participant may have a location and/or facing direction in the virtual environment 400. For example, the location may comprise coordinates and the facing direction may comprise one or more rotations, quaternions, or so on. In one embodiment, the location and/or facing direction may be modified, which may allow the digital representation 420 of the video conference participant to be moved to different locations in the virtual environment 400 and/or be faced in different directions. In one embodiment, one or more locations in the virtual environment 400 may be selectable, and the digital representation 420 of the video conference participant may be moved to and displayed at a selected location. In an embodiment, the digital representation 420 of the video conference participant may be displayed in a seat, in a standing location, or elsewhere in the virtual environment 400.

The digital representation 420 may be presented in various forms according to various embodiments. In one embodiment, the digital representation 420 of the video conference participant may comprise a flat cut out. For example, the digital representation 420 may comprise a flat shape and the video of the video conference participant may be displayed on the flat shape. The flat shape may comprise one or more polygons. In an embodiment, the video of the video conference participant is displayed on a flat surface of the shape.

In an embodiment, virtual environment 400 may optionally include a virtual whiteboard 430. The virtual whiteboard 430 may include one or more user interface controls for adding and editing content on the virtual whiteboard 430.

Figure 6:
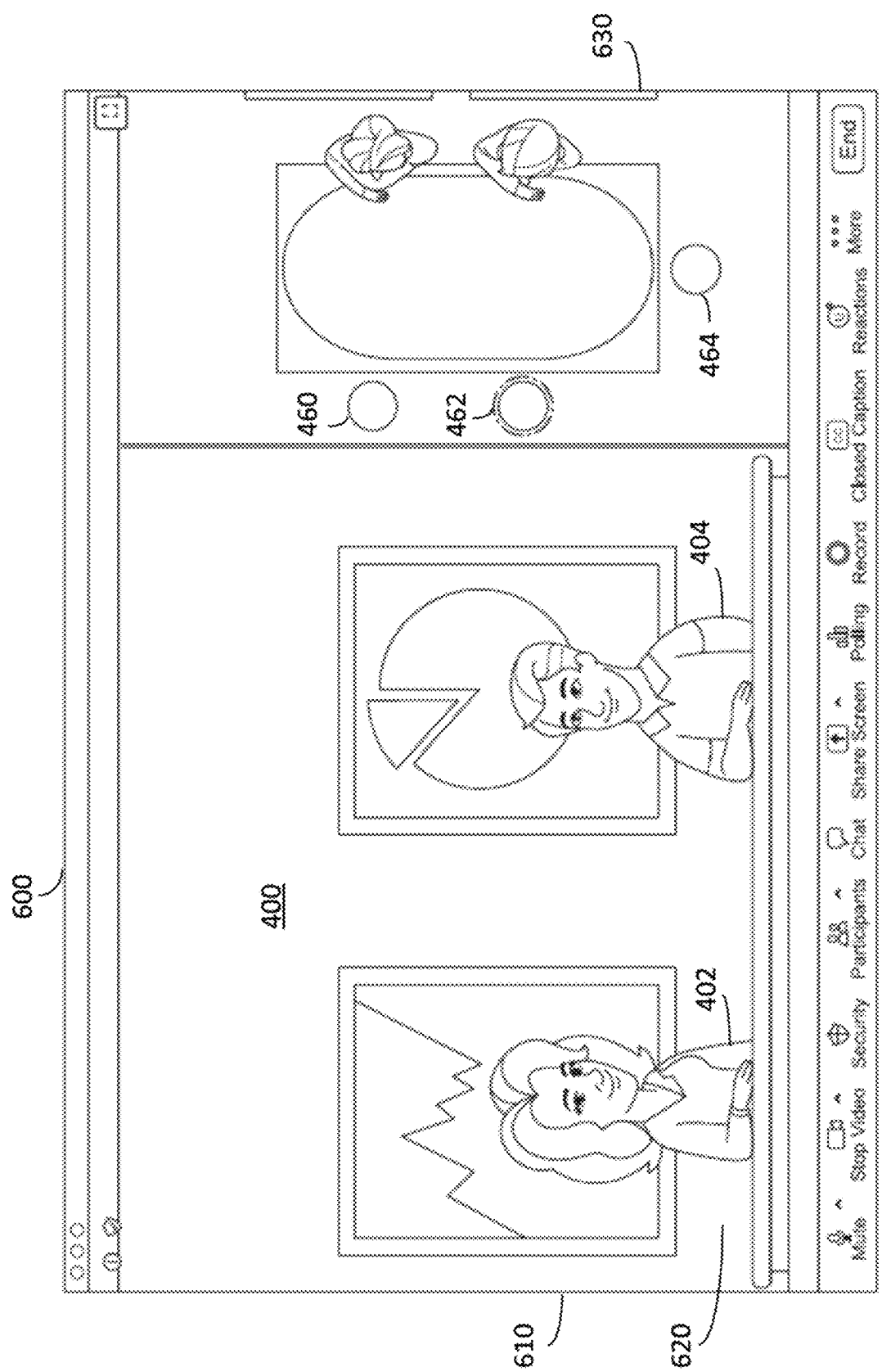
FIG. 6 illustrates an exemplary user interface according to one embodiment of the present disclosure.

FIG. 6 illustrates an exemplary user interface 600 according to one embodiment of the present disclosure. User interface 600 may comprise an interface of a video conferencing application. Content view 610 displays a view of the virtual environment 400, including the 3D avatars 402, 404 of participants in the video conference. The content view 610 may comprise video content 620. In an embodiment, content view 610 may display video content from the viewpoint of the digital representation 420 of the video conferencing participant in the virtual environment 400. In an embodiment, video content 620 of the virtual environment 400 may be captured on a VR/AR device 302 or a virtual environment server 330. The video content 620 may be encoded in streaming video format by an encoder on a VR/AR device 302, virtual environment server 330, or a server 310. In some embodiments, the encoder may comprise SDK 172. The video content may be transmitted from the VR/AR device 302 or virtual environment server 330 to the video conference module 171 of the server 310 and on to the computer system 320 and video conference application 324. User interface 600 may be displayed on a computer system to a video conference participant 326.

In an embodiment, video content 620 may be captured by a virtual camera. The virtual camera may capture a view of the virtual environment 400 comprising a viewport. The viewport may comprise a view of a 3D environment that is captured from a position in the 3D environment. The virtual camera may generate video content based on the portion of the 3D environment that is within the viewport for transmitting to a video conference application.

In an embodiment, the virtual camera may be located at the viewpoint of the digital representation 420 of the video conferencing participant. For example, the virtual camera may have the same location and/or facing direction as the location and facing direction of the digital representation 420 of the video conferencing participant. In an embodiment, virtual camera may have the same location and/or facing direction as the location and facing direction of the eyes, head, chest, or other portion of the digital representation 420 of the video conferencing participant.

In an embodiment, the viewpoint for capturing video content 620 may change when the video conference participant moves the digital representation 420 to a new location and/or facing direction in the virtual environment. In an embodiment, the video content 620 may be captured from the new location and/or facing direction. In an embodiment, the virtual camera may be moved to the new location and/or facing direction.

In an embodiment, interactive view 630 displays a view of the virtual environment 400 and may enable moving the digital representation 420 to new locations in the virtual environment 400. In an embodiment, the video content 620 and interactive view 630 display simultaneous views into the same virtual environment 400. In an embodiment, the same virtual environment 400 is displayed in both the video content 620 and interactive view 630, including being backed by the same backend data on virtual environment server 330 and including the same objects and avatars at the same locations. In an embodiment, both video content 620 and interactive view 630 may be updated when changes are made in the virtual environment 400, such as changes in the location and/or viewpoint of the digital representation 420. In an embodiment, virtual application 176 may provide the interactive view 630. Interactive view 630 may comprise a component of the video conference application 324 or a separate application. In an embodiment, the interactive view 630 renders the virtual environment 400 in 3D graphics generated by 3D engine 326. In an embodiment, the interactive view 630 may be provided in a web browser using a web-compatible 3D engine. In an embodiment, the interactive view 630 may enable the video conference participant 326 to perform the same interactions in the virtual environment 400 as are enabled for a VR/AR user 308 accessing the virtual environment 304 from a VR/AR application on VR/AR device 302. Alternatively, the interactive view 630 may have less functionality or more functionality than a corresponding VR/AR application. In some embodiments, the interactive view 630 may be rendered in 2D, such as a 2D top-down map. In an embodiment, the video content 620 and interactive view 630 may optionally be displayed side by side. In an embodiment, the interactive view 630 may be hidden or opened based on user input.

In an embodiment, the interactive view 630 receives user input and may move the digital representation 420 of the video conference participant in response to and based on the user input. In an embodiment, interactive view 630 may display one or more selectable locations where the digital representation 420 of the video conference participant may be moved. In an embodiment, one or more indicators may be displayed at the selectable locations to indicate that they may be selected. In one embodiment, interactive view 630 may display a plurality of seats 460, 462, 464 that may comprise selectable locations where the digital representation 420 may be moved. An indicator, such as highlighting, circling, effects, and the like, may show the current location of the digital representation 420, such as seat 462. In an embodiment, digital representation 420 may be shown at its location in seat 462. In an embodiment, selectable locations for the digital representation 420 may be predefined, or interactive view 630 may allow an arbitrary location in the virtual environment 400 to be freely selected. In alternative embodiments, interactive view 630 may enable free movement in the virtual environment 400 such as walking or moving around the virtual environment 400 based on user input. In an embodiment, keyboard input, such as arrow keys, may enable the digital representation 420 to walk or move around in the virtual environment 420. In an embodiment, taps, swiping, or clicking may be used to enable the digital representation 420 to step forward, backward, right, or left in the virtual environment 400. User input from the video conference participant may comprise taps, clicks, gestures, keyboard input, sensor input, and other user input.

In an embodiment, user input may be transmitted from the video conference application 324 on the computer system 320 to the virtual environment service 332 on the virtual environment server 330. In an embodiment, the user input may be transmitted by an API. Based on the user input, the virtual environment service 332 may move the digital representation 420 to a new location in the virtual environment 400. For example, when a new location is selected, the virtual environment service 332 may move the digital representation 420 to the selected location. In some embodiments, the digital representation 420 may be moved to the new location instantly, or an animation may be played to move the digital representation 420 to the new location. During a movement animation, the digital representation 420 may be moved to one or more intermediate locations between the original location and the new location. The video content 620 may be updated to display the video stream from the intermediate locations during the movement animation. For example, the virtual camera may be moved to and capture video from the intermediate locations. When free movement is enabled, the virtual environment service 332 may move the digital representation 420 in the virtual environment 400 based on user input, such as allowing the digital representation 420 to walk or move freely in the virtual environment 400.

In an embodiment, video stream 620 and interactive view 630 display simultaneous views into the same virtual environment 400 and may be simultaneously or concurrently updated when the digital representation 420 is moved. In an embodiment, the virtual camera located at the viewpoint of the digital representation 420 for capturing video stream 620 is also moved to the new location of digital representation 420 when digital representation 420 is moved. The video stream 620 is updated to display video content of the virtual environment 400 from the new location of the digital representation 420 when the digital representation 420 is moved in the interactive view 630. When free movement is enabled, the video stream 620 may be displayed to be moving freely in the virtual environment 400 in response to free movement of the digital representation 420 in the interactive view 630. For example, when the digital representation 420 moves forward, the viewpoint of the video stream 620 may move forward, and when the digital representation moves backward, the viewpoint of the video stream 620 also move backward, and so on. The video stream 620 may be simultaneously updated based on movement commands and/or free movement in the interactive view 630.

Figure 7:
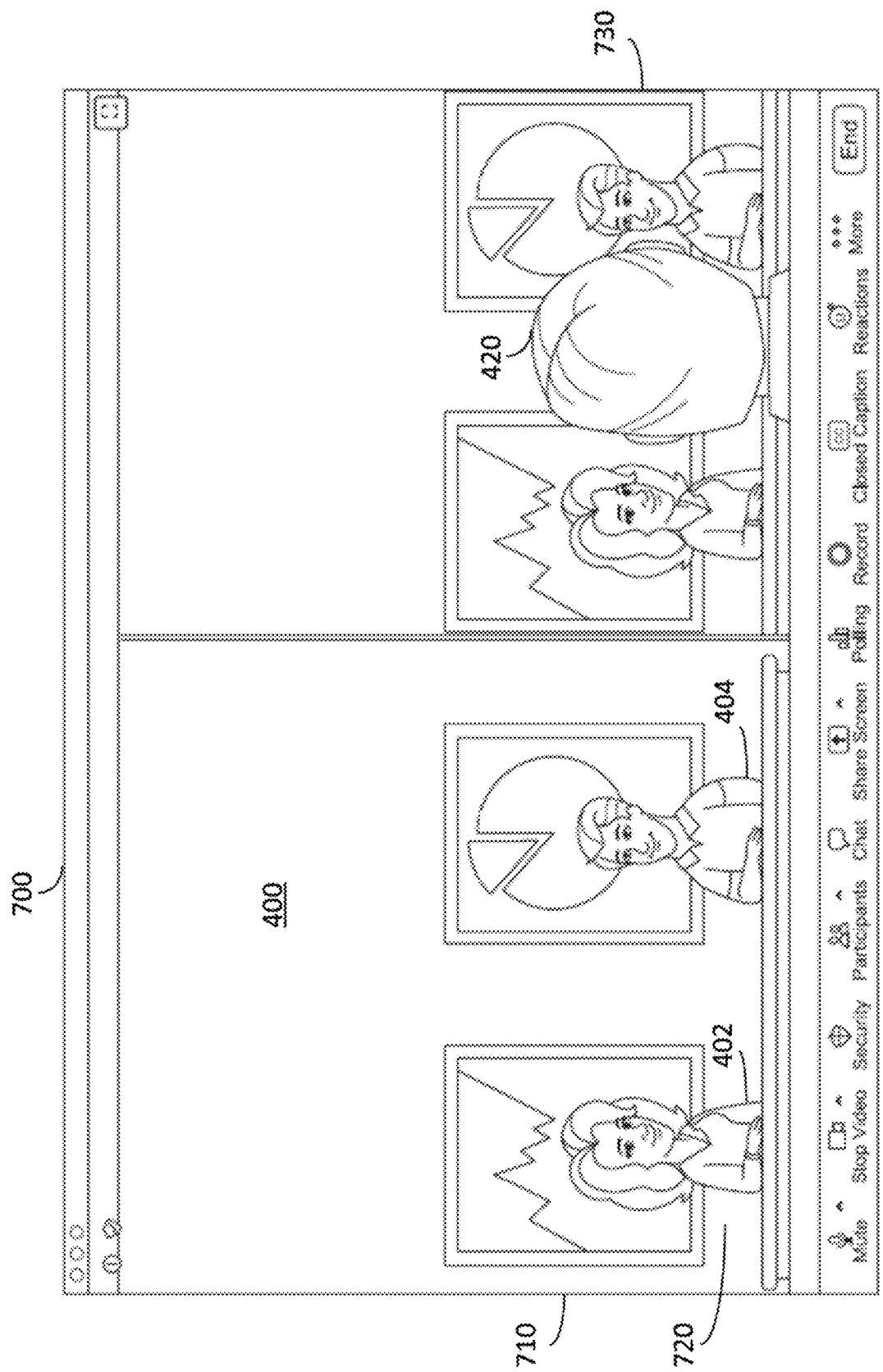
FIG. 7 illustrates an exemplary user interface according to one embodiment of the present disclosure.

FIG. 7 illustrates an exemplary user interface 700 according to one embodiment of the present disclosure. As described elsewhere herein, content view 710 may display a video stream 720 of the virtual environment 400. An exemplary interactive view 730 may display the virtual environment from a third person view, such as behind the digital representation 420. In an embodiment, the interactive view 730 may display the digital representation 420. In an embodiment, the third person view may include selectable locations for moving the digital representation 420, which may comprise predefined or arbitrary locations, or may enable free movement by the digital representation 420 in the virtual environment 400. The interactive view 730 may display the digital representation 420 moving in the virtual environment 400, such as via one or more animations. In an embodiment, when the digital representation 420 is moved, the digital representation 420 may be displayed at the new location in the interactive view 730.

In an embodiment, the interactive view 730 may be displayed from a first person view of the digital representative. In a first person view, the interactive view 730 may display the same perspective of the virtual environment 400 as the video stream 720. The first person view may include selectable locations for moving the digital representation 420 or may enable free movement by the digital representation 420 in the virtual environment 400. The first person view may be displayed with 3D graphics by the 3D engine 326 while the video stream 720 may comprise 2D video content. In an embodiment, the 3D graphics of the interactive view 730 and the 2D video content are updated simultaneously in response to user input moving the digital representation 420 in the virtual environment 400.

In an embodiment, free movement of the digital representation 420 may be enabled by keyboard input, such as arrow keys, for the digital representation 420 to walk or move around in the virtual environment 400. In an embodiment, taps, swiping, or clicking may be used to enable the digital representation 420 to step forward, backward, right, or left in the virtual environment 400. The video stream 720 may be simultaneously updated based on movement commands and/or free movement in the interactive view 730.

In an embodiment, the interactive view 730 may enable a free look capability. In an embodiment, the first person or third person view of the interactive view 730 may be controlled by a mouse, gesture, controller, or other user input to rotate the viewpoint up, down, left, or right. In an embodiment, the free look may change the orientation of the digital representation 420 to look in the direction of the free look movement of the user input. For example, the free look may change the viewpoint of the digital representation 420 and the orientation of the virtual camera capturing video stream 720 to look in a direction chosen by the free look user input. In an embodiment, the video stream 720 may be updated to face in the direction selected by the free look user input.

Figure 8:
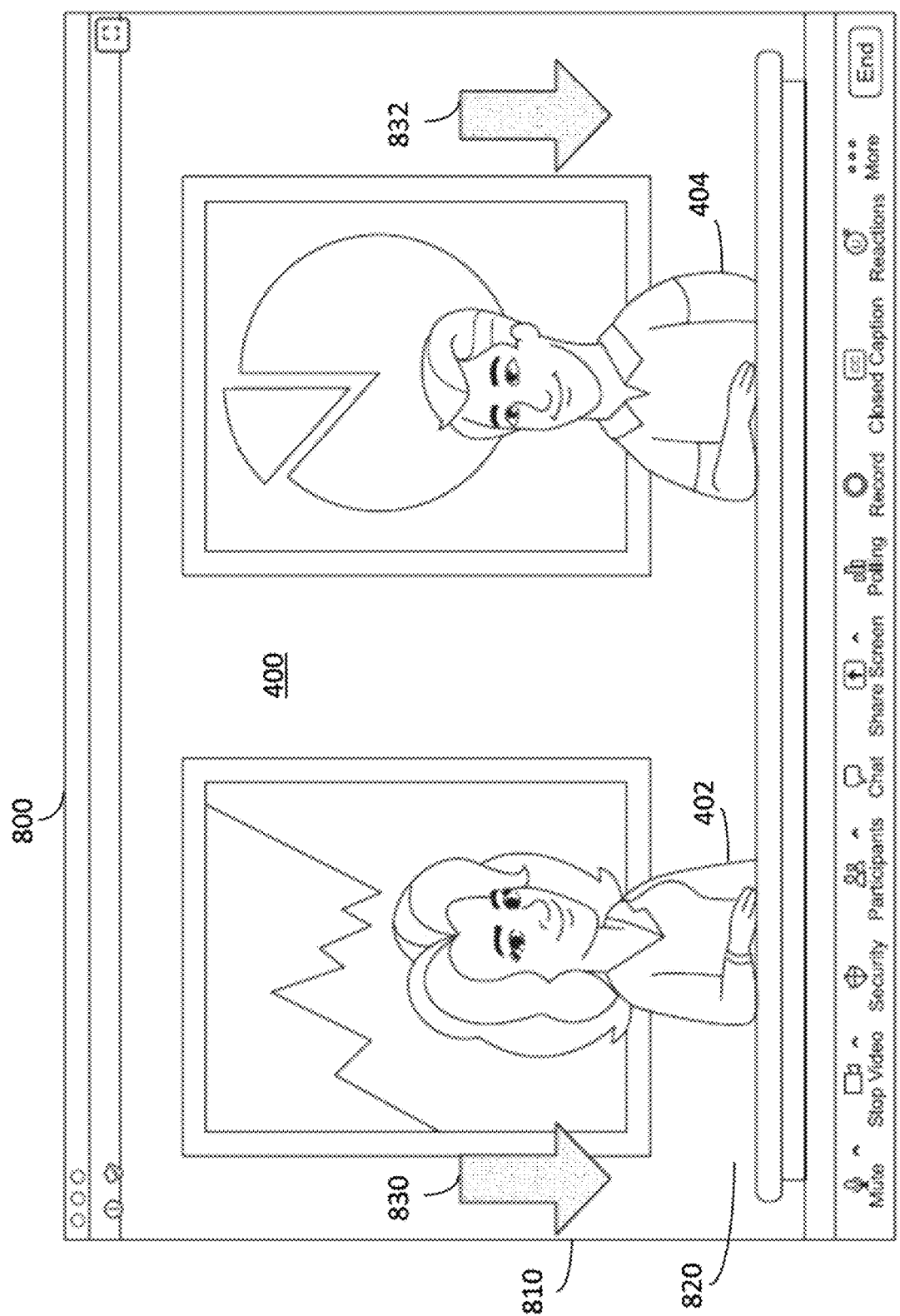
FIG. 8 illustrates an exemplary user interface according to one embodiment of the present disclosure.

FIG. 8 illustrates an exemplary user interface 800 according to one embodiment of the present disclosure. As described elsewhere herein, content view 810 may display a video stream 820 of the virtual environment 400. In an embodiment, content view 810 may comprise an interactive video view that enables user interaction on the video stream 820. In an embodiment, the interactive video view 810 may receive user input and may move the digital representation 420 of the video conference participant in response to and based on the user input. In an embodiment, interactive video view 810 may be provided by the virtual application 176. In an embodiment, interactive video view 810 may display one or more selectable locations 830, 832 where the digital representation 420 of the video conference participant may be moved. For example, the selectable locations 830, 832 may be selected by taps or clicks of the arrows on the video stream 820 of interactive video view 810 or other user input. In an embodiment, one or more indicators may be displayed at the selectable locations to indicate that they may be selected. In an embodiment, selectable locations for the digital representation 420 may be predefined, or interactive video view 810 may allow an arbitrary location in the virtual environment 400 to be freely selected. In alternative embodiments, interactive video view 810 may enable free movement in the virtual environment 400 such as walking or moving around the virtual environment 400 based on user input. In an embodiment, keyboard input, such as arrow keys, may enable the digital representation 420 to walk or move around in the virtual environment 400. In an embodiment, taps, swiping, or clicking may be used to enable the digital representation 420 to step forward, backward, right, or left in the virtual environment 400. User input from the video conference participant may comprise taps, clicks, gestures, keyboard input, sensor input, and other user input.

In an embodiment, the interactive video view 810 may receive and process the user input and transmit the user input from the video conference application 324 on the computer system 320 to the virtual environment service 332 on the virtual environment server 330. Optionally, the user input may be transmitted from the video conference application 324 to the virtual environment service 332 through the video conference module 171 on server 310. In an embodiment, the user input may be transmitted by an API. Based on the user input, the virtual environment service 332 may move the digital representation 420 to a new location in the virtual environment 400. For example, when a new location is selected, the virtual environment service 332 may move the digital representation 420 to the selected location. In some embodiments, the digital representation 420 may be moved to the new location instantly, or an animation may be played to move the digital representation 420 to the new location. During a movement animation, the digital representation 420 may be moved to one or more intermediate locations between the original location and the new location. The video content 820 may be updated to display the video stream from the intermediate locations during the movement animation. For example, the virtual camera may be moved to and capture video from the intermediate locations. When free movement is enabled, the virtual environment service 332 may move the digital representation 420 in the virtual environment 400 based on user input, such as allowing the digital representation 420 to walk or move freely in the virtual environment 400.

In an embodiment, the virtual camera located at the viewpoint of the digital representation 420 for capturing video stream 820 is also moved to the new location of digital representation 420 when digital representation 420 is moved. The video stream 820 is updated to video content of the virtual environment 400 from the new location of the digital representation 420 when the digital representation 820 is moved in the interactive video view 810. When free movement is enabled, the video stream 820 may be displayed to be moving freely in the virtual environment 400 in response to free movement of the digital representation 420 in the interactive video view 810. For example, when the digital representation 420 moves forward, the viewpoint of the video stream 820 may move forward, and when the digital representation moves backward, the viewpoint of the video stream 820 also move backward, and so on. The video stream 820 may be updated based on movement commands and/or free movement in the interactive video view 810.

Figure 9:
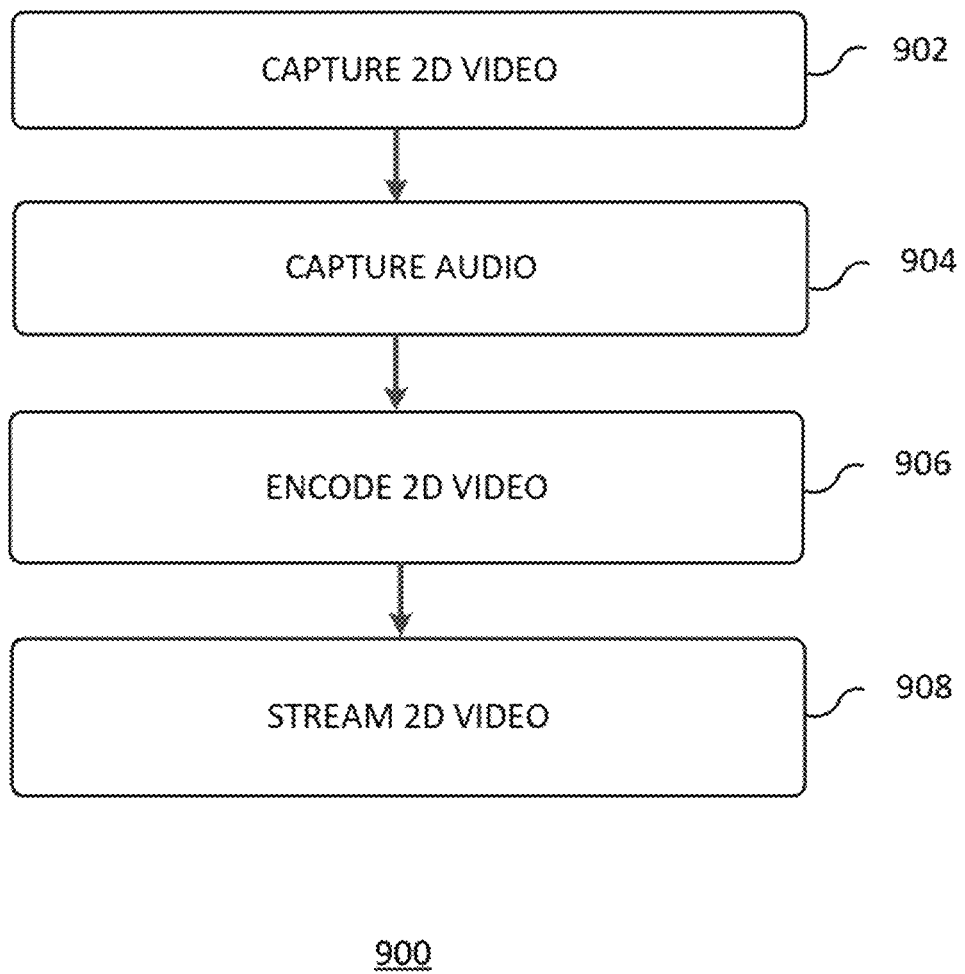
FIG. 9 illustrates an exemplary method that may be performed in some embodiments.

FIG. 9 illustrates an exemplary method 900 that may be performed in some embodiments. Video content may be captured from the virtual environment 400 in many different ways, and method 900 comprises one exemplary method for doing so. At step 902, a video conference application or VR/AR application captures 2D video of a 3D virtual environment. In an embodiment, the 2D video may be captured from the viewport of one or more virtual cameras. At step 904, the video conference application or VR/AR application may capture audio output from the virtual environment and/or from the microphone input of the VR/AR device. At step 906, the video conference application or VR/AR application may encode the 2D video. In some embodiments, the 2D video may be encoded into a streaming video format and may include the audio output. The encoding may be compressed or uncompressed. At step 908, the video conference application may stream the 2D video to a video conference module and one or more client devices.

III. Exemplary Methods

Figure 10:
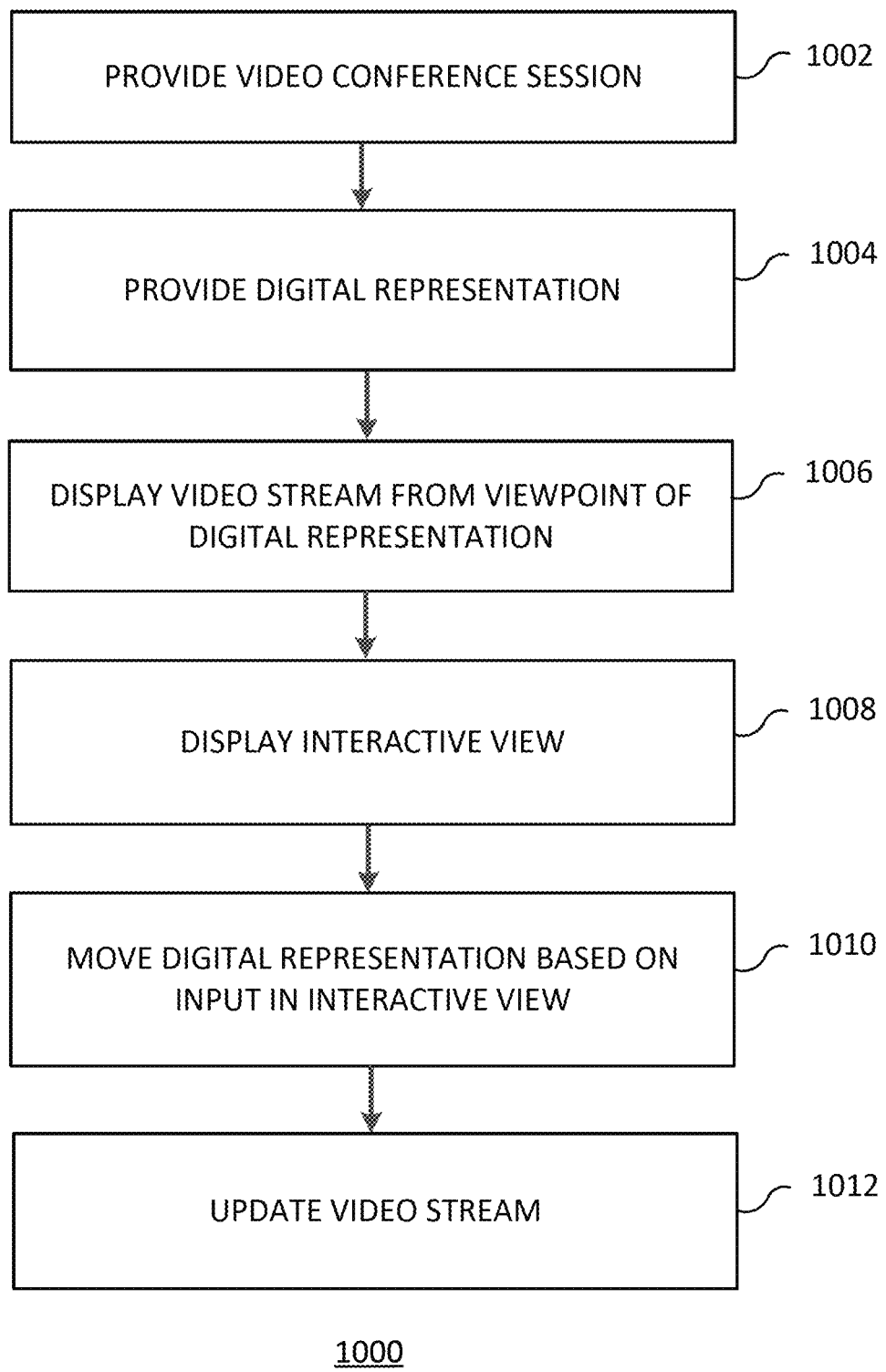
FIG. 10 illustrates an exemplary method that may be performed in some embodiments.

FIG. 10 illustrates an exemplary method 1000 that may be performed in some embodiments.

At step 1002, a video conference session is provided in a virtual environment. In an embodiment, the video conference session is hosted on a server and may connect a plurality of video conference participants. In an embodiment, the video conference session may connect one or more VR/AR users in the virtual environment and one or more video conference participants joining from one or more computer systems.

At step 1004, a digital representation of a video conference participant is provided in the virtual environment. In an embodiment, the digital representation may comprise a 2D or 3D representation of the video conference participant. In one embodiment, the digital representation may comprise streaming video of the video conference participant.

At step 1006, a video stream of the virtual environment is displayed from the viewpoint of the digital representation. In an embodiment, the video stream may be captured by a virtual camera with the same location and facing direction as the location and facing direction of the digital representation of the video conference participant. In an embodiment, the video stream may comprise 2D video content.

At step 1008, an interactive view of the virtual environment capable of receiving user input is displayed. In an embodiment, the interactive view may comprise a 3D rendering of the virtual environment by a 3D engine. In an embodiment, the interactive view may include one or more selectable locations for moving the digital representation of the video conference participant. In an embodiment, the interactive view may enable free movement of the digital representation of the video conference participant.

At step 1010, the digital representation of the video conference participant is moved to a new location in the virtual environment based on input received in the interactive view. In an embodiment, the digital representation of the video conference participant may be moved to the new location based on user selection of the new location. In an embodiment, the digital representation of the video conference participant may be moved to the new location based on free movement in the virtual environment.

At step 1012, the video stream is updated to display the virtual environment from the new location. In an embodiment, a virtual camera of the digital representation of the video conference participant is moved to the new location. In an embodiment, the video stream and interactive view may be simultaneously updated based on changes in the virtual environment.

Figure 11:
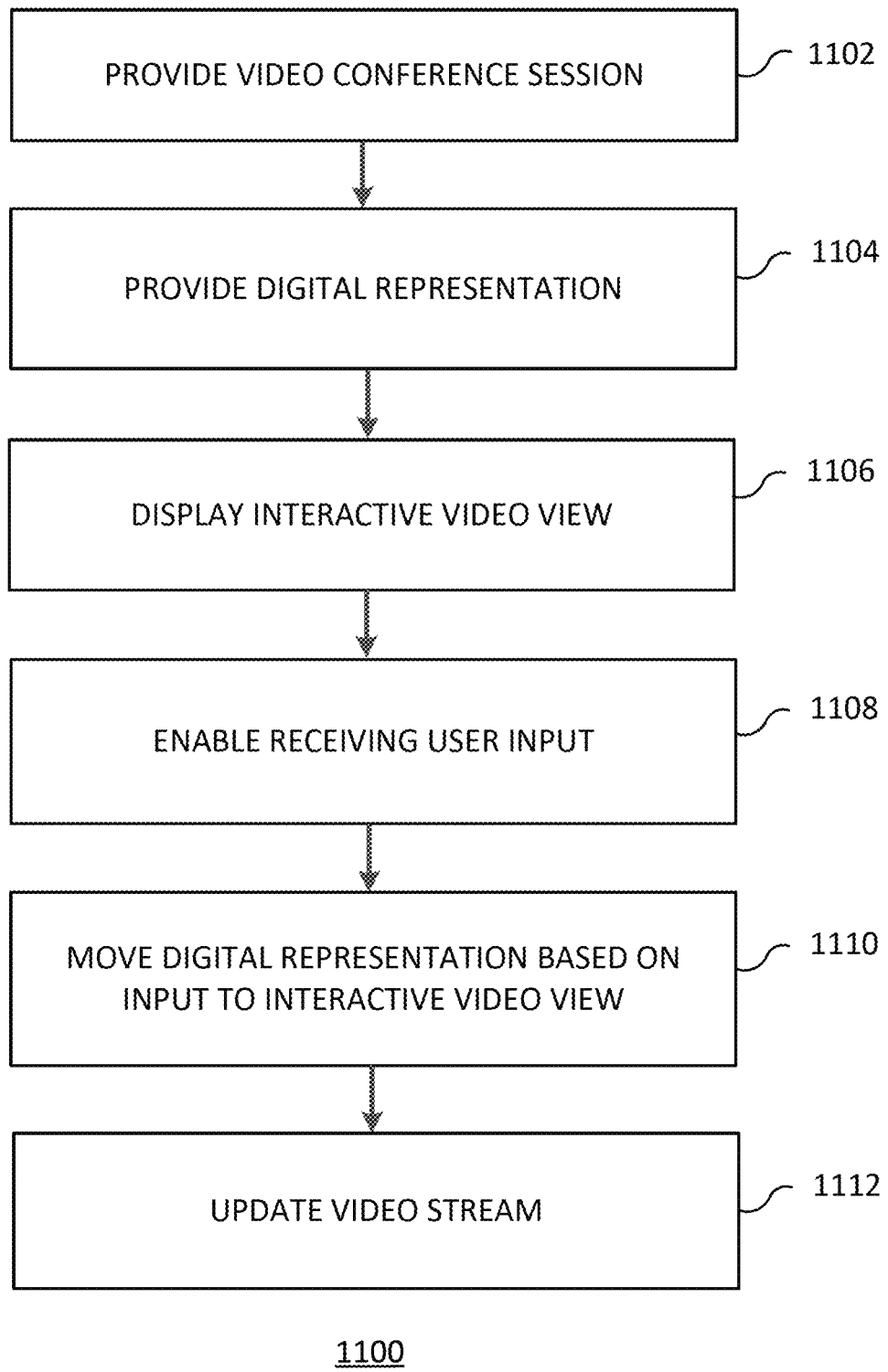
FIG. 11 illustrates an exemplary method that may be performed in some embodiments.

FIG. 11 illustrates an exemplary method 1100 that may be performed in some embodiments.

At step 1102, a video conference session is provided in a virtual environment. In an embodiment, the video conference session is hosted on a server and may connect a plurality of video conference participants. In an embodiment, the video conference session may connect one or more VR/AR users in the virtual environment and one or more video conference participants joining from one or more computer systems.

At step 1104, a digital representation of a video conference participant is provided in the virtual environment. In an embodiment, the digital representation may comprise a 2D or 3D representation of the video conference participant. In one embodiment, the digital representation may comprise streaming video of the video conference participant.

At step 1106, an interactive video view is displayed, including a video stream of the virtual environment displayed from the viewpoint of the digital representation. In an embodiment, the video stream may be captured by a virtual camera with the same location and facing direction as the location and facing direction of the digital representation of the video conference participant. In an embodiment, the video stream may comprise 2D video content.

At step 1108, the interactive video view is enabled to receive user input. In an embodiment, the interactive video view is enabled to receive user input on the video stream. In an embodiment, the interactive video view may include one or more selectable locations for moving the digital representation of the video conference participant. In an embodiment, the interactive video view may enable free movement of the digital representation of the video conference participant.

At step 1110, the digital representation of the video conference participant is moved to a new location in the virtual environment based on input received to the interactive video view. In an embodiment, the digital representation of the video conference participant may be moved to the new location based on user selection of the new location. In an embodiment, the digital representation of the video conference participant may be moved to the new location based on free movement in the virtual environment.

At step 1112, the video stream is updated to display the virtual environment from the new location. In an embodiment, a virtual camera of the digital representation of the video conference participant is moved to the new location.

Exemplary Computer System

Figure 12:
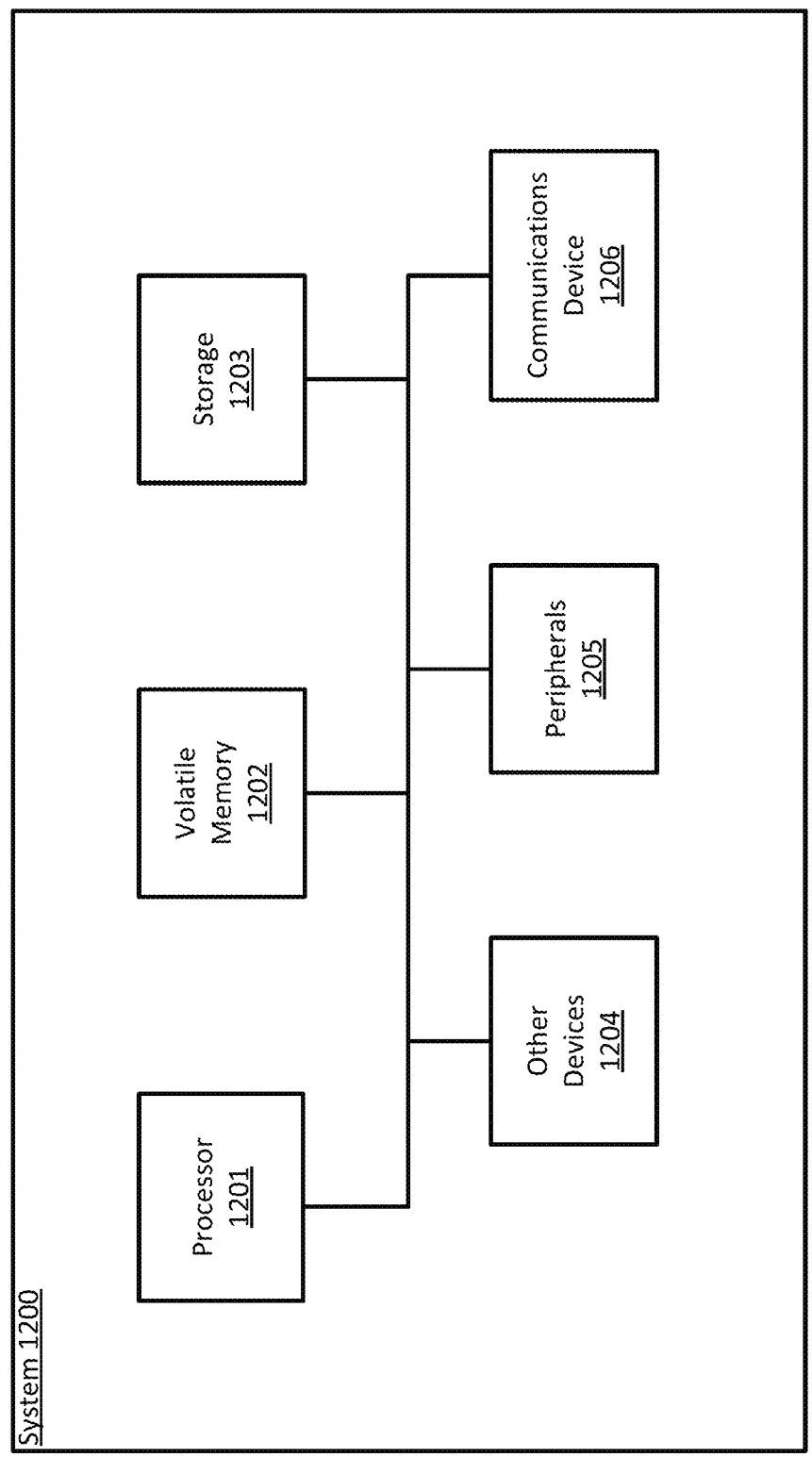
FIG. 12 is a diagram illustrating an exemplary computer that may perform processing in some embodiments.

FIG. 12 is a diagram illustrating an exemplary computer that may perform processing in some embodiments. Exemplary computer 1200 may perform operations consistent with some embodiments. The architecture of computer 1200 is exemplary. Computers can be implemented in a variety of other ways. A wide variety of computers can be used in accordance with the embodiments herein.

Processor 1201 may perform computing functions such as running computer programs. The volatile memory 1202 may provide temporary storage of data for the processor 1201. RAM is one kind of volatile memory. Volatile memory typically requires power to maintain its stored information. Storage 1203 provides computer storage for data, instructions, and/or arbitrary information. Non-volatile memory, which can preserve data even when not powered and including disks and flash memory, is an example of storage. Storage 1203 may be organized as a file system, database, or in other ways. Data, instructions, and information may be loaded from storage 1203 into volatile memory 1202 for processing by the processor 1201.

The computer 1200 may include peripherals 1205. Peripherals 1205 may include input peripherals such as a keyboard, mouse, trackball, video camera, microphone, and other input devices. Peripherals 1205 may also include output devices such as a display. Peripherals 1205 may include removable media devices such as CD-R and DVD-R recorders/players. Communications device 1206 may connect the computer 1200 to an external medium. For example, communications device 1206 may take the form of a network adapter that provides communications to a network. A computer 1200 may also include a variety of other devices 1204. The various components of the computer 1200 may be connected by a connection medium such as a bus, crossbar, or network.

It will be appreciated that the present disclosure may include any one and up to all of the following examples.

Example 1: A method comprising: providing a video conference session in a virtual environment; providing a digital representation of a video conference participant in the virtual environment; providing for display a video stream of the virtual environment from the viewpoint of the digital representation; providing for display an interactive view of the virtual environment capable of receiving user input; moving the digital representation of the video conference participant to a new location in the virtual environment based on input received in the interactive view; updating the video stream to display the virtual environment from the new location.

Example 2: The method of Example 1, wherein the virtual environment comprises a VR environment including 3D avatars of one or more users.

Example 3: The method of any of Examples 1-2, wherein the virtual environment comprises an AR environment comprising one or more AR holograms.

Example 4: The method of any of Examples 1-3, wherein the digital representation of the video conference participant comprises a video of the video conference participant.

Example 5: The method of any of Examples 1-4, wherein the video stream and interactive view are simultaneously updated based on changes in the virtual environment.

Example 6: The method of any of Examples 1-5, further comprising: displaying the digital representation of the video conference participant in the interactive view at the new location.

Example 7: The method of any of Examples 1-6, wherein the interactive view enables selecting the new location.

Example 8: The method of any of Examples 1-7, wherein the interactive view enables free movement.

Example 9: The method of any of Examples 1-8, wherein the interactive view displays a top-down view of the virtual environment.

Example 10: The method of any of Examples 1-9, wherein the interactive view displays a third person view of the digital representation.

Example 11: The method of any of Examples 1-10, wherein the interactive view displays a first person view from the viewpoint of the digital representation.

Example 12: The method of any of Examples 1-11, wherein the interactive view is generated by a 3D engine.

Example 13: The method of any of Examples 1-12, wherein the video stream and interactive view are displayed side by side.

Example 14: The method of any of Examples 1-13, wherein the digital representation of the video conference participant comprises a flat shape in the virtual environment displaying a video stream of the video conference participant.

Example 15: The method of any of Examples 1-14, wherein the video conference session receives communications from the virtual environment via an SDK.

Example 16: The method of any of Examples 1-15, wherein the interactive view is provided through an API.

Example 17: A non-transitory computer readable medium that stores executable program instructions that when executed by one or more computing devices configure the one or more computing devices to perform operations comprising: providing a video conference session in a virtual environment; providing a digital representation of a video conference participant in the virtual environment; providing for display a video stream of the virtual environment from the viewpoint of the digital representation; providing for display an interactive view of the virtual environment capable of receiving user input; moving the digital representation of the video conference participant to a new location in the virtual environment based on input received in the interactive view; updating the video stream to display the virtual environment from the new location.

Example 18: The non-transitory computer readable medium of Example 17, wherein the virtual environment comprises a VR environment including 3D avatars of one or more users.

Example 19: The non-transitory computer readable medium of any of Examples 17-18, wherein the virtual environment comprises an AR environment comprising one or more AR holograms.

Example 20: The non-transitory computer readable medium of any of Examples 17-19, wherein the digital representation of the video conference participant comprises a video of the video conference participant.

Example 21: The non-transitory computer readable medium of any of Examples 17-20, wherein the video stream and interactive view are simultaneously updated based on changes in the virtual environment.

Example 22: The non-transitory computer readable medium of any of Examples 17-21, wherein the executable program instructions further configure the one or more computing devices to perform operations comprising: displaying the digital representation of the video conference participant in the interactive view at the new location.

Example 23: The non-transitory computer readable medium of any of Examples 17-22, wherein the interactive view enables selecting the new location.

Example 24: The non-transitory computer readable medium of any of Examples 17-23, wherein the interactive view enables free movement.

Example 25: The non-transitory computer readable medium of any of Examples 17-24, wherein the interactive view displays a top-down view of the virtual environment.

Example 26: The non-transitory computer readable medium of any of Examples 17-25, wherein the interactive view displays a third person view of the digital representation.

Example 27: The non-transitory computer readable medium of any of Examples 17-26, wherein the interactive view displays a first person view from the viewpoint of the digital representation.

Example 28: The non-transitory computer readable medium of any of Examples 17-27, wherein the interactive view is generated by a 3D engine.

Example 29: The non-transitory computer readable medium of any of Examples 17-28, wherein the video stream and interactive view are displayed side by side.

Example 30: The non-transitory computer readable medium of any of Examples 17-29, wherein the digital representation of the video conference participant comprises a flat shape in the virtual environment displaying a video stream of the video conference participant.

Example 31: The non-transitory computer readable medium of any of Examples 17-30, wherein the video conference session receives communications from the virtual environment via an SDK.

Example 32: The non-transitory computer readable medium of any of Examples 17-31, wherein the interactive view is provided through an API.

Example 33: A system comprising one or more processors configured to perform the operations of: providing a video conference session in a virtual environment; providing a digital representation of a video conference participant in the virtual environment; providing for display a video stream of the virtual environment from the viewpoint of the digital representation; providing for display an interactive view of the virtual environment capable of receiving user input; moving the digital representation of the video conference participant to a new location in the virtual environment based on input received in the interactive view; updating the video stream to display the virtual environment from the new location.

Example 34: The system of Example 33, wherein the virtual environment comprises a VR environment including 3D avatars of one or more users.

Example 35: The system of any of Examples 33-35, wherein the virtual environment comprises an AR environment comprising one or more AR holograms.

Example 36: The system of any of Examples 33-35, wherein the digital representation of the video conference participant comprises a video of the video conference participant.

Example 37: The system of any of Examples 33-36, wherein the video stream and interactive view are simultaneously updated based on changes in the virtual environment.

Example 38: The system of any of Examples 33-37, wherein the processors are further configured to perform the operations of: displaying the digital representation of the video conference participant in the interactive view at the new location.

Example 39: The system of any of Examples 33-38, wherein the interactive view enables selecting the new location.

Example 40: The system of any of Examples 33-39, wherein the interactive view enables free movement.

Example 41: The system of any of Examples 33-40, wherein the interactive view displays a top-down view of the virtual environment.

Example 42: The system of any of Examples 33-41, wherein the interactive view displays a third person view of the digital representation.

Example 43: The system of any of Examples 33-42, wherein the interactive view displays a first person view from the viewpoint of the digital representation.

Example 44: The system of any of Examples 33-43, wherein the interactive view is generated by a 3D engine.

Example 45: The system of any of Examples 33-44, wherein the video stream and interactive view are displayed side by side.

Example 46: The system of any of Examples 33-45, wherein the digital representation of the video conference participant comprises a flat shape in the virtual environment displaying a video stream of the video conference participant.

Example 47: The system of any of Examples 33-46, wherein the video conference session receives communications from the virtual environment via an SDK.

Example 48: The system of any of Examples 33-47, wherein the interactive view is provided through an API.

Example 49: A method comprising: providing a video conference session in a virtual environment; providing a digital representation of a video conference participant in the virtual environment; displaying an interactive video view, including a video stream of the virtual environment displayed from the viewpoint of the digital representation; enabling the interactive video view to receive user input; moving the digital representation of the video conference participant to a new location in the virtual environment based on input received to the interactive video view; updating the video stream to display the virtual environment from the new location.

Example 50: The method of Example 49, wherein the digital representation of the video conference participant comprises a video of the video conference participant.

Example 51: The method of any of Examples 49-50, wherein the interactive video view enables selecting the new location.

Example 52: The method of any of Examples 49-51, wherein the interactive video view enables free movement.

Example 53: A non-transitory computer readable medium that stores executable program instructions that when executed by one or more computing devices configure the one or more computing devices to perform operations comprising: providing a video conference session in a virtual environment; providing a digital representation of a video conference participant in the virtual environment; displaying an interactive video view, including a video stream of the virtual environment displayed from the viewpoint of the digital representation; enabling the interactive video view to receive user input; moving the digital representation of the video conference participant to a new location in the virtual environment based on input received to the interactive video view; updating the video stream to display the virtual environment from the new location.

Example 54: The non-transitory computer readable medium of Example 53, wherein the digital representation of the video conference participant comprises a video of the video conference participant.

Example 55: The non-transitory computer readable medium of any of Examples 53-54, wherein the interactive video view enables selecting the new location.

Example 56: The non-transitory computer readable medium of any of Examples 53-55, wherein the interactive video view enables free movement.

Example 57: A system comprising one or more processors configured to perform the operations of: providing a video conference session in a virtual environment; providing a digital representation of a video conference participant in the virtual environment; displaying an interactive video view, including a video stream of the virtual environment displayed from the viewpoint of the digital representation; enabling the interactive video view to receive user input; moving the digital representation of the video conference participant to a new location in the virtual environment based on input received to the interactive video view; updating the video stream to display the virtual environment from the new location.

Example 58: The system of Example 57, wherein the digital representation of the video conference participant comprises a video of the video conference participant.

Example 59: The system of any of Examples 57-58, wherein the interactive video view enables selecting the new location.

Example 60: The system of any of Examples 57-59, wherein the interactive video view enables free movement.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
providing a video conference session in a virtual environment;
providing a digital representation of a video conference participant m the virtual environment;
providing a video stream of the virtual environment from the viewpoint of the digital representation within the virtual environment;
providing an interactive view of the virtual environment;
receiving user input based on one or more selections of virtual environment locations displayed with an instance of the interactive view of the virtual environment;
moving the digital representation of the video conference participant to a new location in the virtual environment based on the received user input; and
updating the video stream to display the virtual environment from the new location.

2. The method of claim 1, wherein the virtual environment comprises a virtual reality (VR) environment.

3. The method of claim 1, wherein the virtual environment comprises an augmented reality (AR) environment comprising one or more AR holograms.

4. The method of claim 1, wherein the digital representation of the video conference participant comprises a video of the video conference participant.

5. The method of claim 1, wherein the video stream and interactive view are simultaneously updated based on changes in the virtual environment.

6. The method of claim 1, further comprising:
providing a third person view of the digital representation of the video conference participant in the interactive view at the new location.

7. The method of claim 1, wherein providing the video stream of the virtual environment and the interactive view of the virtual environment comprises:
initiating generation of a concurrent display, for the video conference participant, of the video stream of the virtual environment and the instance of the interactive view of the virtual environment.

8. The method of claim 1, wherein the one or more selections of virtual environment locations displayed within the instance of the interactive view of the virtual environment further comprise:
selection of a facing direction for the digital representation corresponding to an updated viewpoint at the new location.

9. A non-transitory computer readable medium that stores executable program instructions that when executed by one or more computing devices configure the one or more computing devices to perform operations comprising:
providing a video conference session in a virtual environment;
providing a digital representation of a video conference participant m the virtual environment;
providing a video stream of the virtual environment from the viewpoint of the digital representation within the virtual environment;
providing an interactive view of the virtual environment;
receiving user input based on one or more selections of virtual environment locations displayed with an instance of the interactive view of the virtual environment;
moving the digital representation of the video conference participant to a new location in the virtual environment based on the received user input; and
updating the video stream to display the virtual environment from the new location.

10. The non-transitory computer readable medium of claim 9, wherein the virtual environment comprises a VR environment.

11. The non-transitory computer readable medium of claim 9, wherein the virtual environment comprises an AR environment comprising one or more AR holograms.

12. The non-transitory computer readable medium of claim 9, wherein the digital representation of the video conference participant comprises a video of the video conference participant.

13. The non-transitory computer readable medium of claim 9, wherein the video stream and interactive view are simultaneously updated based on changes in the virtual environment.

14. The non-transitory computer readable medium of claim 9, wherein the executable program instructions further configure the one or more computing devices to perform operations comprising:
providing a third person view of the digital representation of the video conference participant in the interactive view at the new location.

15. The non-transitory computer readable medium of claim 9, wherein the interactive view enables selecting the new location.

16. A system comprising one or more processors configured to perform the operations of:
providing a video conference session in a virtual environment;
providing a digital representation of a video conference participant m the virtual environment;
providing a video stream of the virtual environment from the viewpoint of the digital representation within the virtual environment;
providing an interactive view of the virtual environment;
receiving user input based on one or more selections of virtual environment locations displayed with an instance of the interactive view of the virtual environment;
moving the digital representation of the video conference participant to a new location in the virtual environment based on the received user input; and
updating the video stream to display the virtual environment from the new location.

17. The system of claim 16, wherein the digital representation of the video conference participant comprises a video of the video conference participant.

18. The system of claim 16, wherein the video stream and interactive view are simultaneously updated based on changes in the virtual environment.

19. The system of claim 16, wherein the processors are further configured to perform the operations of:
providing a third person view of the digital representation of the video conference participant in the interactive view at the new location.

20. The system of claim 16, wherein the video conference session receives communications from the virtual environment via an SDK.

* * * * *